United States Patent
Cheboxarov

(10) Patent No.: US 9,168,984 B2
(45) Date of Patent: Oct. 27, 2015

(54) WIND POWER PLANT

(75) Inventor: Victor Valeryevich Cheboxarov, Vladivostok (RU)

(73) Assignees: Federal Agency for Legal Protection of Millitary, Special and Dual Use Intellectual Activity Results (FALPIAR), Moscow (RU); Far East Federal University (FEFU), Vladivostok (RU)

( * ) Notice: Subject to any disclaimer, the term of this patent is extended or adjusted under 35 U.S.C. 154(b) by 275 days.

(21) Appl. No.: 14/007,880

(22) PCT Filed: Mar. 27, 2012

(86) PCT No.: PCT/RU2012/000220
§ 371 (c)(1),
(2), (4) Date: Sep. 26, 2013

(87) PCT Pub. No.: WO2012/134349
PCT Pub. Date: Oct. 4, 2012

(65) Prior Publication Data
US 2014/0014020 A1    Jan. 16, 2014

(30) Foreign Application Priority Data
Mar. 29, 2011    (RU) .................................. 2011111894

(51) Int. Cl.
*B63B 21/50*    (2006.01)
*B63B 35/44*    (2006.01)
*F03D 3/00*    (2006.01)
*F03D 3/06*    (2006.01)

(52) U.S. Cl.
CPC ................. *B63B 35/44* (2013.01); *B63B 21/50* (2013.01); *F03D 3/005* (2013.01); *F03D 3/067* (2013.01); *B63B 2035/446* (2013.01); *F05B 2240/93* (2013.01); *Y02E 10/74* (2013.01)

(58) Field of Classification Search
CPC .. B63B 21/50; B63B 35/44; B63B 2035/446; F03D 3/005; F03D 3/007; F03D 3/067; F03D 11/04; F03D 11/045; F05B 2240/21; F05B 2240/211; F05B 2240/93; F05B 240/95; Y02E 10/727; Y02E 10/74
USPC ...................... 114/264, 265, 293; 290/44, 55; 405/195.1, 223.1, 224; 416/85, 86
See application file for complete search history.

(56) References Cited

U.S. PATENT DOCUMENTS

| 4,050,246 A | 9/1977 | Bourquardez | |
| 8,174,135 B1 * | 5/2012 | Roe | F03B 13/16 290/43 |
| 2012/0068465 A1 * | 3/2012 | Dawoud | F03D 3/062 290/55 |

FOREIGN PATENT DOCUMENTS

| CN | WO 2010037335 A1 * | 4/2010 | F03D 3/061 |
| CN | WO 2013040871 A1 * | 3/2013 | B63B 35/44 |

(Continued)

*Primary Examiner* — Ajay Vasudeva
(74) *Attorney, Agent, or Firm* — Andrew W. Chu; Craft Chu PLLC

(57) ABSTRACT

The wind power plant includes blades mounted on an annular pontoon. The pontoon is rotatable about a vertical axis. An energy converter is situated on a platform that is encircled by the annular pontoon. A kinematic mechanism is designed so as to be capable of transmitting the rotational energy of the annular pontoon to the receiving unit of the energy converter. The floating platform is equipped with positioning means that include at least six anchors located on the bottom of a body of water. The anchors are connected to the platform by flexible members and are offset in a direction opposite to the direction of rotation of the annular pontoon relative to the point at which the flexible member is attached to the platform. The technical result is an increase in the number of places where the wind power plants can be installed and an increase in electric power generation.

5 Claims, 3 Drawing Sheets

(56) References Cited

FOREIGN PATENT DOCUMENTS

| | | | | |
|---|---|---|---|---|
| DE | 3224976 A1 * | 1/1984 | ............ | F03D 11/04 |
| GB | WO 03016714 A1 * | 2/2003 | ............. | F03D 3/005 |
| RU | 2118705 C1 | 9/1998 | | |
| RU | 2330989 C1 | 8/2008 | | |
| SU | 1719713 A1 | 3/1992 | | |

\* cited by examiner

WIND POWER PLANT

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The invention relates to small-scale power generation and can be used for producing wind farms.

2. Description of Related Art Including Information Disclosed Under 37 CFR 1.97 and 37 CFR 1.98

A wind power plant is known that comprises wind-receiving work members arranged on an annular pontoon and an energy converter kinematically connected to the pontoon (USSR Inventor's Certificate No. 1719713, IPC5 F03D Mar. 6, 1992).

The disadvantage of this solution consists in complicated transfer of mechanical energy to electric generators, especially when the wheel dimensions are increased, which is caused by the presence of forces moving the pontoon radially during its rotation. Thus, the pontoon efficiently interacts only with those generators toward which the said force acts. Moreover, the necessity of constructing an annular channel (or, at least, installing several supporting members (stops) along the pontoon external periphery) significantly complicates and raises the price of the plant mounting.

A wind power plant is also known that comprises an energy converter made capable of converting rotational energy, an annular pontoon arranged with the possibility of rotating about its vertical axis, rotatable blades arranged on the annular pontoon and made rotatable about their vertical axes, flexible links coupled to the annular pontoon and to the energy converter hub arranged with the possibility of rotating co-axially with the annular pontoon, a kinematic mechanism made capable of transferring the annular pontoon rotational energy to the receiving unit of the energy converter (RF Patent No. 2330989, IPC F 03 D Mar. 6, 2008).

The disadvantage of this solution consists in great hydrodynamic losses of energy and low productivity, since the floating platform is made rotatable.

A wind power plant is also known that comprises blades arranged on an annular pontoon made rotatable about its vertical axis, an energy converter made capable of converting rotational energy and arranged on a platform encircled by the annular pontoon, a kinematic mechanism made capable of transferring the annular pontoon rotational energy to the receiving unit of the energy converter (RF Patent No. 2118705, IPC6 F 03 D Mar. 6, 1998).

The disadvantage of this prototype consists in that the wind power plant cannot be installed at a deep-water shelf area because the platform in this solution is made stationary.

The task which the claimed solution is directed to is to remove limitations concerning a place for installing a wind power plant in a water area.

SUMMARY OF THE INVENTION

The technical effect that is achieved due to the fulfillment of the set task consists in expanding the range of possible places for arranging wind power plants to free sea shelf areas having depths more than 50 meters in a zone of strongest and stable winds with low turbulence, which also increases electric energy production.

The task is solved due to the fact that the proposed wind power plant comprises: blades arranged on an annular pontoon made rotatable about its vertical axis, an energy converter made capable of converting rotational energy and arranged on a platform encircled by the annular pontoon, a kinematic mechanism made capable of transferring the annular pontoon rotational energy to the receiving unit of the energy converter; the said wind power plant being characterized in that the platform is made floatable and provided with positioning means including at least six anchors located on the bottom of a body of water, preferably in pairs, and connected to the platform by flexible members in such a way that the horizontal plane projection of one flexible member is oriented radially to the annular pontoon rotation axis, and the projection of the second flexible member is oriented tangentially, an anchor connected thereto being offset in a direction opposite to the annular pontoon rotation direction relative to the point at which the flexible member is attached to the platform. The anchors are located beyond the range of the platform sea bottom projection.

Furthermore, the platform comprises a floating base and an above-water part provided with an energy converter and connected to the fully submerged floating base, hermetically sealed columns which length is greater than the sum of the platform above-water height and the depth range of wind-induced waves, the length of the column cross-section being greater that the width, the cross-section long axis being oriented radially to the annular pontoon rotation axis, and, furthermore, the distance from the annular pontoon rotation axis to the most distant area of the hermetically sealed column being less than the annular pontoon inner radius. Furthermore, the platform floating base is made in the form of a regular polygon, the flexible members are attached to the platform floating base at points that are most distant from the annular pontoon rotation axis and, preferably, equally spaced therebetween. Furthermore, the horizontal dimensions of the platform floating base are greater than the corresponding dimensions of the platform above-water part.

A comparative study of the essential features of the claimed solution and those of the prototype proves that the claimed solution complies with the criterion of "novelty".

The features included into the distinguishing part of the claims solve the following functional tasks.

The feature " . . . the platform is made floatable and provided with positioning means . . . " enables arrangement of the wind power plant at shelf areas more than 50 meters deep, where use of a stationary platform is impossible or unprofitable.

The features stating that the positioning means include "at least six anchors located on the bottom of a body of water, preferably in pairs, and connected to the platform by flexible members in such a way that the horizontal plane projection of one flexible member is oriented radially to the annular pontoon rotation axis", enable to prevent drifting the floating base over the water surface. And the presence of the flexible members makes the structure work easier during rough sea changing water level.

The feature " . . . and the projection of the second flexible member is oriented tangentially, an anchor connected thereto being offset in a direction opposite to the annular pontoon rotation direction relative to the point at which the flexible member is attached to the platform" ensures reliable transfer of a torsion torque created by wind from the platform to the bottom of a body of water, which prevents the platform from turning about the vertical axis and, thus, guarantees workability of the floating wind power plant.

The arrangement of the anchors outside the bottom projection of the platform ensures a decrease of tensile forces in the flexible members and a decrease in the anchor weight, as well as improves positional stability of the wind power plant.

The features included in claim 3 enable to lessen the wave influence on movements of the floating wind power plant and improve reliability due to lesser wave influence. Thus, the feature " . . . comprises . . . an above-water part . . . and connected to the fully submerged floating base, hermetically sealed columns . . . " ensures vertical stabilization, and the features " . . . the length of the column cross-section being greater that the width, the cross-section long axis being oriented radially to the annular pontoon rotation axis" enable to increase a weight of any added water and, thus, decrease the dynamic constituent of tensile forces in the flexible members and reduce the anchor weight. Furthermore, the feature " . . . the distance from the annular pontoon rotation axis to the most distant area of the hermetically sealed column being less than the annular pontoon inner radius" ensures rotation of the annular pontoon relative to the floating platform.

The features of claim 4 enable to increase a weight of added water and, thus, decrease the dynamic constituent of tensile forces in the flexible members and reduce the anchor weight. The feature stating that "the flexible members are attached to the platform floating base at points that are most distant from the annular pontoon rotation axis and, preferably, equally spaced therebetween" ensures a decrease in the static constituent of tensile forces in the flexible members and a reduction of the anchor weight. The features included in claim 5 ensure a decrease of tensile forces in the flexible members and a reduction of the anchor weight as well as improves positional stability of the floating wind power plant.

DETAILED DESCRIPTION OF THE DRAWINGS

Figure 1:
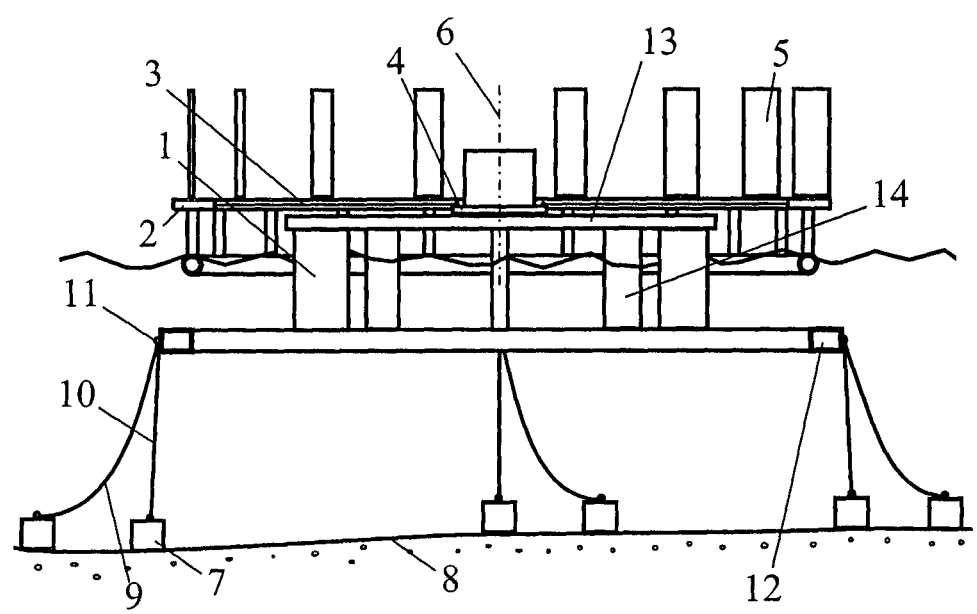
FIG. 1 shows a horizontal elevation view of the wind power plant.
Figure 2:
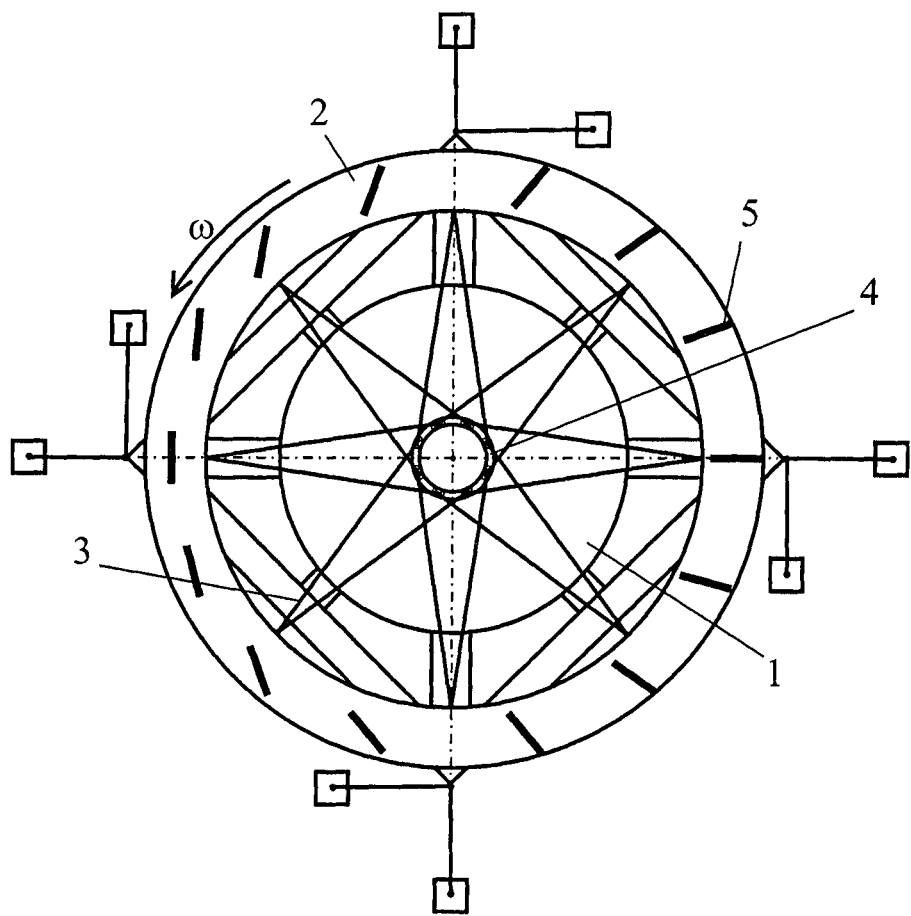
FIG. 2 shows a top plan view.
Figure 3:
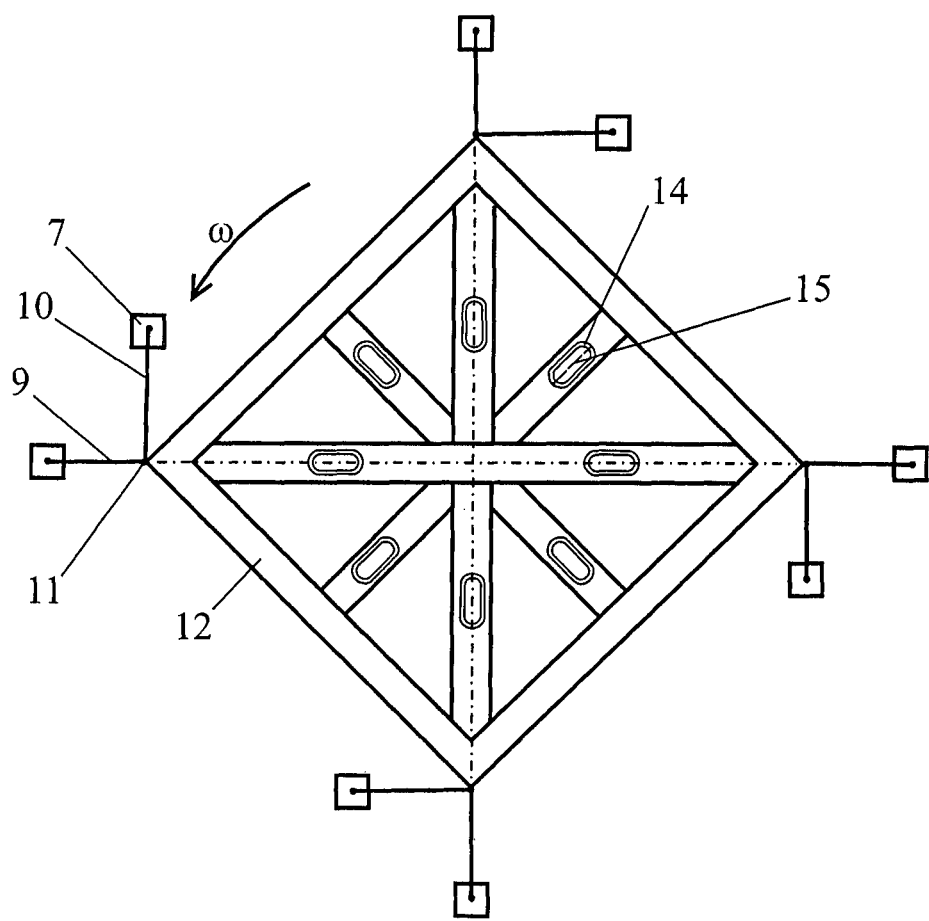
FIG. 3 shows a horizontal sectional view along the water surface.

Figures show the platform 1, the annular pontoon 2, the kinematic mechanism 3, the receiving unit 4 of the energy converter, a blade 5, the vertical rotation axis 6 of the annular pontoon 2, the anchors 7, the bottom 8 of a body of water, the flexible members 9 and 10, the point 11 at which the flexible members 9 and 10 are attached to the floating base 12 of the platform 1, the above-water part 13 of the platform 1, a hermetically sealed column 14, the long axis 15 of section of the hermetically sealed column 14.

The wind power plant comprises the platform 1 encircled by the annular pontoon 2, the kinematic mechanism 3 made capable of transferring rotational energy of the annular pontoon 2 to the receiving unit 4 of the energy converter (the energy converter is not fully shown in the drawings).

The blades 5 are arranged on the annular pontoon 2 that is made rotatable relative to the vertical axis 6. The platform 1 is made floatable and provided with the positioning means including at least six anchors 7 located on the bottom 8 of a body of water, preferably in pairs, and connected to the platform 1 by the flexible members (cables or chains) 9 and 10 in such a way that the horizontal plane projection of one flexible member 9 is oriented radially to the rotation axis 6 of the annular pontoon 2, and the projection of the second flexible member 10 is oriented tangentially, the anchor 7 connected thereto being offset in a direction opposite to the rotation direction of the annular pontoon 2 relative to the point 11 at which the flexible members 9 and 10 are attached to the floating base 12. The anchors 7 are located out of the range of the projection of the platform 1 on the sea bottom 8. Furthermore, the platform 1 comprises the floating base 12 and the above-water part 13 provided with the energy converter 4 and connected to the fully submerged floating base 12, the hermetically sealed columns 14 which length is greater than the sum of the platform 1 above-water height and the depth range of wind-induced waves, the length of the column cross-section being greater that the width, the cross-section long axis 15 being oriented radially to the rotation axis 6 of the annular pontoon 2, which axis coincides with the vertical axis of the platform 1. The floating base 12 of the platform 1 is made in the form of a regular polygon, the flexible members 9 and 10 are attached to the platform 1 at the points 11 of the floating base, which points are most distant from the rotation axis 6 of the annular pontoon 2 and, preferably, equally spaced therebetween. Furthermore, the horizontal dimensions of the floating base 12 of the platform 1 are greater than the corresponding dimensions of the platform above-water part and are approximated to the diameter of the annular pontoon 2.

The wind power plant can be operated as follows.

The wind power plant is transported by towing as the floating assembly to the place of arrangement. When the predetermined shelf location is reached, the anchors 7 are cast to the bottom 8 at a significant distance beyond the projection of the platform 1 on the bottom 8. The anchors 7 are attached by means of the flexible members 9 and 10 to the floating base 12 of the platform 1 at the points 11. The flexible members 9 ensure, by means of the anchors 7 attached thereto, a stable position of the platform 1 in the horizontal plane, and the displacable volume of the floating base 12 and the hermetically sealed columns 14 ensures stability of the vertical position of the platform 1.

A wind flow acting on the blades 5 creates a torsion moment that is transferred via the kinematic mechanism 3 to the receiving unit 4 of the energy converter, and from the latter to the platform 1. This torsion moment is balanced by the moment created by the horizontal constituents of tensile forces in the flexible members 10.

An inclination of the flexible members 9 and 10 enables, due to remoteness of the anchors 7 from the projection of the platform 1 on the bottom 8, to decrease said forces and the weights of the anchors 7. Meanwhile, the dynamic constituent of the torsion moment, which is caused by wind gusts, is leveled by the inertia of the platform 1 and great masses of added water, which is facilitated by the non-rounded shape of the floating base 12 and the radially elongated shape of the hermetically sealed columns 14.

I claim:
1. A wind power plant comprising:
blades arranged on an annular pontoon made rotatable relative to a vertical axis thereof,
an energy converter for rotational energy, being arranged on a platform encircled by said annular pontoon,
a means for kinematic transfer of rotational energy of the annular pontoon to a receiving unit of the energy converter;
wherein said platform is made floatable and provided with positioning means including at least six anchors located on a bottom of a body of water, said at least six anchors being arranged in pairs and being connected to the plat- form by flexible members, wherein a horizontal plane projection of one flexible member is oriented radially to an annular pontoon rotation axis, and wherein a horizontal plane projection of a second flexible member is oriented tangentially to a peripheral portion of the platform, an anchor connected thereto being offset in a direction opposite to the annular pontoon rotation direction relative to the point at which the flexible member is attached to the platform.

2. The wind power plant according to claim 1, wherein the anchors are located beyond a range of a platform sea bottom projection.

3. The wind power plant according to claim 1, wherein the platform comprises a floating base and an above-water part provided with an energy converter and connected to the fully submerged floating base, hermetically sealed columns having length greater than a sum of the platform above-water height and the depth range of wind-induced waves, length of a column cross-section being greater that the width, a cross-section long axis being oriented radially to the annular pontoon rotation axis, and, a distance from the annular pontoon rotation axis to the most distant area of the hermetically sealed column being less than the annular pontoon inner radius.

4. The wind power plant according to claim 3, wherein the platform floating base is made in a form of a regular polygon, the flexible members being attached to the platform floating base at points most distant from the annular pontoon rotation axis and equally spaced therebetween.

5. The wind power plant according to claim 4, wherein horizontal dimensions of the platform floating base are greater than corresponding dimensions of the platform above-water part.

* * * * *